United States Patent [19]
Coffey

[11] 3,951,932
[45] Apr. 20, 1976

[54] PROCESS FOR PREPARING OLEFINIC NITRILE-VINYL AROMATIC RESINS

[75] Inventor: Gerald Paul Coffey, Cleveland Heights, Ohio

[73] Assignee: Standard Oil Company, Cleveland, Ohio

[22] Filed: June 17, 1974

[21] Appl. No.: 480,123

[52] U.S. Cl. .............................. 526/85; 526/342; 526/347; 260/879
[51] Int. Cl.² ........................................ C08F 120/44
[58] Field of Search .................. 260/85.5 A, 85.5 N, 260/88.7 F, 88.7 R, 85.5 R, 85.5 HC, 88.7 A

[56] References Cited
UNITED STATES PATENTS

| | | | |
|---|---|---|---|
| 2,605,256 | 7/1952 | Conard ........................ | 260/85.5 N |
| 2,621,170 | 12/1952 | Banes ........................... | 260/85.5 N |
| 2,662,877 | 12/1953 | Chaney ........................ | 260/85.5 R |
| 3,345,350 | 10/1967 | Shavit .......................... | 260/85.5 R |
| 3,627,820 | 12/1971 | Chujo .......................... | 260/85.5 N |
| 3,686,112 | 8/1972 | Vrancken ..................... | 260/85.5 N |
| 3,819,762 | 6/1974 | Howe .......................... | 260/85.5 HC |

*Primary Examiner*—Paul R. Michl
*Attorney, Agent, or Firm*—John F. Jones; Sherman J. Kemmer; Evelyn R. Kosman

[57] ABSTRACT

A process for preparing polymeric compositions having low permeability to gases and which are particularly useful in the packaging industry wherein said polymers are prepared from rubber-modified copolymers of an olefinically unsaturated nitrile monomer and a vinyl aromatic monomer using tertiary butyl mercaptan as a chain transfer agent in the polymerization reaction.

8 Claims, No Drawings

PROCESS FOR PREPARING OLEFINIC NITRILE-VINYL AROMATIC RESINS

The present invention relates to a process for preparing polymeric compositions which have low permeability to gases and which are particularly useful in the packaging industry. More particularly this invention pertains to a process for preparing these impermeable polymeric compositions from rubber-modified copolymers of an olefinically unsaturated nitrile monomer and a vinyl aromatic monomer which includes the use of tertiary butyl mercaptan as a chain transfer agent in the polymerization reaction.

A chain transfer agent may be defined as an agent that effectively controls the molecular weight of a polymer by stopping the growth of a polymeric chain and starting the growth of another polymer chain preferably without adversely affecting polymerization rate. With a chain transfer agent such as an alkyl mercaptan, it is postulated that the growth of the polymeric chain is stopped by donation of a hydrogen atom from the mercaptal (SH) group as a result of homolytic cleavage. The resulting thiyl radical (RS) then functions as an initiator to start the growth of a new polymeric chain. The initiation by a thiyl radical is facilitated by either electron withdrawing groups in the mercaptan or electron-donating groups in the monomer.

Up to the present time, the general practice has been to employ alkyl mercaptans in the molecular weight range of from 8 to 16 carbon atoms as chain transfer agents for nitrile resins. Their use in nitrile resins has certain disadvantages, however. The relatively high concentration levels of these mercaptans required to achieve the necessary molecular weight control adds significantly to the cost of the resin, and the low volatility of these mercaptans presents a potential residual odor and taste problem in the resin.

These disadvantages have been overcome in the present invention with the use of tertiary butyl mercaptan as a chain transfer agent wherein effective molecular weight control is achieved at concentrations as low as 0.5 parts by weight per hundred parts of monomer, and tertiary butyl mercaptan is sufficiently volatile so that it can be readily removed from the resin by vacuum stripping the resin latex. Additionally, with the use of this particular transfer agent, resins with good color, color stability and clarity are routinely obtained at high conversion levels.

It is surprising that the problems associated with odor and taste characteristics of resins prepared using alkyl mercaptans as chain transfer agents are minimized with the use of tertiary butyl mercaptan in view of the fact that these problems are much more pronounced with other low molecular weight alkyl mercaptans, such as the ethyl, n-propyl, isopropyl and n-butyl mercaptans, as is hereinafter illustrated.

The resins of this invention are composed of copolymers of an olefinically unsaturated nitrile, a vinyl aromatic monomer, and optionally a diene rubber. The polymers of this invention are those produced by polymerizing a major protion of a mono-unsaturated nitrile such as acrylonitrile and a minor portion of the vinyl aromatic monomer such as styrene copolymerizable with said nitrile, in an aqueous medium, preferably in the presence of a preformed diene rubber which may be a homopolymer or a copolymer of a conjugated diene monomer.

The olefinically unsaturated nitriles useful in the present invention are the alpha, beta-olefinically unsaturated mononitriles having the structure

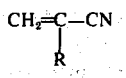

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The vinyl aromatic monomers useful in the present invention include styrene, alpha-methyl styrene, the vinyl toluenes, the vinyl xylenes, nuclear halogenated styrenes such as the chloro- and bromo-styrenes, and the like. Most preferred vinyl aromatic monomers are styrene and alpha-methyl styrene.

The conjugated diene monomers useful in the present invention include butadiene-1,3, isoprene, chloroprene, bromoprene, cyanoprene, 2,3-dimethyl-butadiene-1,3, 2-ethyl-butadiene-1,3, 2,3-diethyl-butadiene-1,3, and the like, and others. Most preferred for the purpose of this invention are butadiene and isoprene because of their ready availability and their excellent copolymerization properties.

The process of the present invention is particularly applicable to the production of polymeric compositions resulting from the polymerization of 100 parts by weight of (A) at least 50% by weight of at least one nitrile having the structure

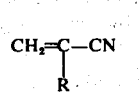

wherein R has the foregoing designation and (B) up to 50% by weight based on the combined weight of (A) and (B) of a vinyl aromatic monomer selected from the group consisting of styrene and alpha-methyl styrene, in the presence of from 0 to 40 parts by weight of (C) a rubbery polymer of (1) a conjugated diene monomer selected from the group consisting of butadiene and isoprene, (2) a vinyl aromatic monomer selected from the group consisting of styrene and alpha-methyl styrene, and/or (3) an olefinic nitrile having the structure

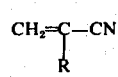

wherein R has the foregoing designation and wherein the rubbery polymer contains from 50 to 95% by weight of polymerized conjugated diene, the remainder being polymerized vinyl aromatic and/or polymerized olefinic nitrile.

The process of the present invention is preferably carried out to produce resins resulting from the polymerization of 100 parts by weight of (A) at least 70% by weight of at least one nitrile monomer having the structure

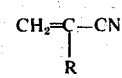

wherein R has the foregoing designation and (B) up to 30% by weight based on the combined weights of (A) and (B) of a vinyl aromatic monomer selected from the group consisting of styrene and alpha-methyl styrene, in the presence of from 5 to 20 parts by weight of (C) a rubber polymer of (1) a conjugated diene monomer selected from the group consisting of butadiene and isoprene, (2) a vinyl aromatic monomer selected from the group consisting of styrene and alpha-methyl styrene, and/or (3) an olefinic nitrile having the structure

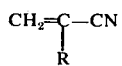

wherein R has the foregoing designation and wherein the rubbery polymer contains from 60 to 80% by weight of polymerized conjugated diene and the remainder being polymerized vinyl aromatic and/or polymerized olefinic nitrile.

The polymeric compositions embodied in the present invention are prepared in accordance with the process of this invention preferably in an aqueous medium, wherein the monomers are copolymerized in the presence of an emulsion or suspension of the preformed rubber. It is important that the olefinic nitrile monomer and vinyl aromatic monomer be added continuously to the preformed rubber during the course of the polymerization in order to produce the desired transparent, impact resistant, gas-barrier resins. The tertiary butyl mercaptan is preferably incorporated in the monomer mixture in amounts ranging from about 0.3 to 1.0 part by weight per hundred parts of monomer (phm) and more preferably in amounts ranging from about 0.45 to 0.75 phm.

The process of the present invention can be more specifically illustrated in the case of the copolymerization of acrylonitrile and styrene in the presence of a preformed rubbery polymer of butadiene-1,3 and styrene. The polymerization reaction is carried out preferably in the substantial absence of molecular oxygen, in the presence of a polymerization initiator, and an emulsifier, at a temperature in the range of from about 0° to 100°C.

The preformed rubbery polymer, preferably in latex form, is placed in the polymerization reactor, a small amount of polymerization initiator is added, the polymerization conditions are set and the acrylonitrile, styrene and chain transfer agent are then added to the polymerization reactor in a continuous fashion over a period of a few hours. If desired, there can also be added to polymerization reactor additional water which may contain additional fresh polymerization initiator. It is preferred that the polymer solids be maintained at about 20 to 33% by weight in the polymerization reaction medium by the controlled addition of monomers and water thereto during the course of the polymerization reaction.

The products produced by the process of this invention are thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent clarity and solvent resistance, and their high impact strength and excellent gas and vapor barrier properties make them especially useful in the packaging industry, as for example, in the manufacture of bottles, film and other types of containers for liquids and solids. With such excellent combination of properties, the copolymers of this invention can be used for many other purposes for which the known thermoplastic resins and thermosetting resins by themselves are entirely unsuited.

The invention described herein can be more readily understood from the following illustrative example, however, it is not to be construed that the scope of this invention is to be limited by this example. The amounts of the ingredients utilized in this example is expressed in parts by weight unless otherwise specified.

EXAMPLE I

A. Preparation of the Elastomer

| Components | Parts by Weight |
|---|---|
| P & G Soap flakes | 2.0 |
| Demineralized water | 200 |
| Butadiene | 75 |
| Styrene | 25 |
| t-Dodecyl mercaptan | 0.7 |
| Sodium salts of polymerized alkyl naphthalene sulfonic acids (Daxad - 11) | 0.1 |
| Potassium persulfate | 0.15 |

The elastomer was prepared by batch polymerization at 60°C for a reaction period of 12 to 16 hours until a conversion level of 84–88 percent was achieved. 0.02 Parts per hundred parts of monomer (phm) of Dow FG - 10 antifoaming agent (polydimethyl siloxane, 50% solution) was added, and the latex was carefully vented of unreacted butadiene, giving an elastomer yield of 29–31% solids content.

B. Preparation of the Copolymer

To a stainless steel reactor were added the following components:

| Components | Parts by Weight |
|---|---|
| Water | 250.0 |
| GAFAC RE-610[1] | 1.5 |
| Citric Acid Monohydrate | 0.2 |
| 75/25 Butadiene/styrene elastomer, prepared in (A) | 5 |
| Acrylonitrile | 9.6 |
| Styrene[2] | 0.4 |

[1] A mixture of R—O—(CH$_2$CH$_2$O—)$_n$PO$_3$M$_2$ and [R—O—(CH$_2$CH$_2$O—)$_n$]$_2$PO$_2$M wherein "n" is a number from 1 to 40, "R" is an alkyl or alkaryl group and M is hydrogen, ammonia or an alkali metal, produced by General Aniline and Film Corp.

The mixture was heated to 60°C and 0.1 parts of initiator Vazo-52 (2,2' azobis-α,γ-dimethyl valero-nitrile) was added. After a period of 10 minutes a mixture of the following components were continuously added over a period of 6 hours:

| Components | Parts by Weight |
|---|---|
| Acrylonitrile | 65.4 |
| Styrene[2] | 24.6 |
| Tertiary Butyl Mercaptan | 0.60 |

[2] Stored over Drierite and filtered prior to use.

At the 2½ hour and 4½ hour periods of monomer/mercaptan feed, additional Vazo-52 in amounts of 0.03 phm were added to the reaction mixture. The reaction was continued for an additional ½ hour at 60°C after the monomer/mercaptan addition was completed. A conversion of 80.3% was obtained.

The latex was coagulated with aqueous Al$_2$(SO$_4$)$_3$ . 18H$_2$O in a concentration of 3.0 phr, by weight, at 90°–92°C, and the resin was washed with water at room temperature. The resin was then dried in a fluid bed dryer for 2 hours at an air inlet temperature of 60°C.

EXAMPLE II

The preparation of Example I was repeated with the exception that the chain transfer agent employed was n-propyl mercaptan.

EXAMPLE III

The preparation of Example I was repeated with the exception that the chain transfer agent was isopropyl mercaptan.

Samples of the resins prepared in Examples 1–3 were subjected to taste and odor evaluation using the following procedure:

1. Eighty-six (86) grams of each sample were fused on a shearing mill roll at 182°C until the material was plasticized and homogenized. The fused resin was then cut into three 28-gram sections.
2. A 28-gram section was placed in a plaque mold, (6 inches × 6 inches × 0.04 inch) at 182°C, preheated for 2 minutes, then heated under 1000 psi for 15 seconds, and cooled for 2 more minutes under pressure.
3. Plaques were then biaxially oriented on a T. M. Long Film Orienter at 125°C to a 3 × 3 draw ratio at a stretch rate of 2000%/minute. Equivalent surface areas were then placed in two-gallon battery jars with plate glass lids and were stored at least 24 hours before testing.

Nineteen panel members were presented with battery jars containing the samples to be tested plus one empty jar for control and were asked to rate the odors on a scale from none to extreme (1–10).

The individual results were tabulated and subjected to statistical evaluation.

The results of this evaluation are shown in Table I.

Table I

| Example | Chain Transfer Agent | Absolute Rating (Scale 1–10) | Difference from Control |
|---|---|---|---|
|   | Empty Control | 2.0 | — |
| 1 | t-Butyl mercaptan | 4.6 | 2.6 |
| 2 | n-Propyl mercaptan | 8.2 | 6.2 |
| 3 | iso-Propyl mercaptan | 7.2 | 5.2 |

The results in the table illustrate that the polymer having the least amount of residual odor was that prepared with tertiary butyl mercaptan as the chain transfer agent, and the intensity of the odor associated with polymers prepared using the aliphatic analogues, n-propyl mercaptan and isopropyl mercaptan, was markedly greater.

I claim:

1. The process for preparing a thermoplastic, processable polymer consisting essentially of a nitrile and a vinyl aromatic copolymer having low permeability to gases and low odor and taste transfer characteristics comprising, polymerizing in an aqueous emulsion medium containing from about 0.3 to 1.0 part by weight of tertiary butyl mercaptan per hundred parts of monomer as a molecular weight modifier, an emulsifier and a free-radical polymerization initiator in the substantial absence of molecular oxygen, 100 parts by weight of:
   A. at least 50% by weight of at least one nitrile having the structure

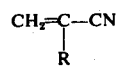

wherein R is hydrogen, a lower alkyl group having from 1 to 4 carbon atoms or a halogen, and
   B. up to 50% by weight based on the combined weight of (A) and (B) of a vinyl aromatic, in the presence of from 0 to about 40 parts by weight of (C) a preformed rubbery polymer of a conjugated diene monomer selected from the group consisting of butadiene and isoprene, and at least one member selected from the group consisting of a vinyl aromatic and a nitrile as defined in (A), wherein said rubbery polymer contains from 50 to 95% by weight of polymerized conjugated diene, and the remainder being polymerized vinyl aromatic and or polymerized olefinic nitrile.

2. The process in claim 1 wherein the (A) component is acrylonitrile.
3. The process in claim 1 wherein the (A) component is methacrylonitrile.
4. The process in claim 2 wherein the (B) component is styrene.
5. The process in claim 1 wherein there is employed a mixture of at least 70% by weight of component (A) and up to 30% by weight of component (B).
6. The process in claim 4 wherein there is employed a mixture of 75% by weight of (A) and 25% by weight of (B).
7. The process in claim 5 wherein the polymerization is carried out in the temperature range of from 0° to 100°C.
8. The process in claim 5 wherein the rubbery polymer in (C) is a copolymer of butadiene and styrene.

* * * * *